United States Patent
Fey et al.

(10) Patent No.: US 8,657,380 B2
(45) Date of Patent: Feb. 25, 2014

(54) SEAT ASSEMBLY HAVING A MOVEABLE HEADREST ASSEMBLY

(75) Inventors: Ralph Fey, Zirndorf (DE); Karsten Mueller, Ingolstadt (DE); Zdzislaw Sobieski, Eching (DE)

(73) Assignee: Lear Corporation, Southfield, MI (US)

( * ) Notice: Subject to any disclaimer, the term of this patent is extended or adjusted under 35 U.S.C. 154(b) by 127 days.

(21) Appl. No.: 13/369,862

(22) Filed: Feb. 9, 2012

(65) Prior Publication Data

US 2012/0235460 A1 Sep. 20, 2012

(30) Foreign Application Priority Data

Mar. 16, 2011 (DE) .......................... 10 2011 005 590

(51) Int. Cl.
*A47C 7/36* (2006.01)
(52) U.S. Cl.
USPC .......................................................... 297/410
(58) Field of Classification Search
USPC ................................ 297/409, 404, 410, 391
See application file for complete search history.

(56) References Cited

U.S. PATENT DOCUMENTS

| | | | |
|---|---|---|---|
| 4,265,482 A | 5/1981 | Nishimura et al. | |
| 4,674,797 A | 6/1987 | Tateyama | |
| 4,856,848 A * | 8/1989 | O'Sullivan et al. | 297/391 |
| 4,991,907 A * | 2/1991 | Tanaka | 297/408 |
| 5,683,141 A * | 11/1997 | Wakamatsu et al. | 297/408 |
| 6,082,817 A | 7/2000 | Mueller | |
| 6,390,558 B2 | 5/2002 | Fischer et al. | |
| 6,688,697 B2 | 2/2004 | Baumann et al. | |
| 6,715,829 B2 | 4/2004 | Svantesson et al. | |
| 6,767,064 B2 | 7/2004 | Veine et al. | |
| 6,805,411 B2 | 10/2004 | Gramss et al. | |
| 6,899,395 B2 | 5/2005 | Yetukuri et al. | |
| 7,048,336 B2 | 5/2006 | Mawbey et al. | |
| 7,070,235 B2 | 7/2006 | Schilling et al. | |
| 7,073,863 B1 | 7/2006 | Low et al. | |
| 7,111,901 B2 | 9/2006 | Schlierf et al. | |
| 7,137,668 B2 | 11/2006 | Kreitler | |
| 7,195,313 B2 | 3/2007 | Hippel et al. | |
| 7,232,187 B1 | 6/2007 | Sundararajan et al. | |
| 7,562,936 B1 | 7/2009 | Veine et al. | |
| 7,871,129 B2 | 1/2011 | Boes et al. | |
| 8,038,219 B2 | 10/2011 | Boes et al. | |
| 8,408,645 B2 * | 4/2013 | Alexander et al. | 297/216.12 |
| 2001/0028191 A1 | 10/2001 | Lance | |
| 2001/0040396 A1 | 11/2001 | Kreuels et al. | |
| 2004/0195894 A1 | 10/2004 | Pal et al. | |
| 2005/0077762 A1 | 4/2005 | Kraemer et al. | |
| 2005/0116515 A1 | 6/2005 | Schlierf et al. | |
| 2006/0071518 A1 | 4/2006 | Hippel et al. | |

(Continued)

FOREIGN PATENT DOCUMENTS

| | | |
|---|---|---|
| DE | 102004005695 A1 | 8/2004 |
| DE | 102006015785 A1 | 10/2006 |
| DE | 102008060641 A1 | 6/2009 |

(Continued)

*Primary Examiner* — Milton Nelson, Jr.
(74) *Attorney, Agent, or Firm* — Brooks Kushman P.C.

(57) ABSTRACT

A seat assembly having a support post assembly and a moveable headrest assembly. The support post assembly has first and second posts and a cross member. The cross member extends from the first post to the second post. The headrest assembly includes a mounting unit that defines a post cavity that receives the first and second posts. The cross member extends through first and second slots in the mounting unit.

20 Claims, 7 Drawing Sheets

(56) References Cited

U.S. PATENT DOCUMENTS

| | | |
|---|---|---|
| 2006/0226688 A1 | 10/2006 | Terada et al. |
| 2007/0216211 A1 | 9/2007 | Mori |
| 2008/0100118 A1* | 5/2008 | Young et al. ............... 297/404 |
| 2010/0270841 A1* | 10/2010 | Sobieski et al. ............ 297/391 |
| 2010/0270842 A1 | 10/2010 | Mueller et al. |
| 2011/0109143 A1* | 5/2011 | Maddelein et al. .......... 297/404 |
| 2012/0080926 A1* | 4/2012 | Fey et al. .................... 297/410 |
| 2012/0126605 A1 | 5/2012 | Gross et al. |

FOREIGN PATENT DOCUMENTS

| | | |
|---|---|---|
| DE | 102010041941.9 | 10/2010 |
| FR | 2852066 A1 | 9/2004 |
| GB | 2340744 A | 3/2000 |
| WO | 2004089688 A1 | 10/2004 |
| WO | 2007073034 A1 | 6/2007 |

* cited by examiner

SEAT ASSEMBLY HAVING A MOVEABLE HEADREST ASSEMBLY

CROSS-REFERENCE TO RELATED APPLICATION

This application claims foreign priority benefits under 35 U.S.C. §119(a)-(d) to DE 10 2011 005 590.8, filed Mar. 16, 2011, the disclosure of which is hereby incorporated by reference in its entirety.

BACKGROUND OF THE INVENTION

1. Field of the Invention

The present invention relates to a seat assembly having a moveable headrest assembly.

2. Background Art

A seat assembly having a moveable headrest assembly is disclosed in U.S. Pat. No. 7,871,129.

SUMMARY OF THE INVENTION

In at least one embodiment, a seat assembly is provided. The seat assembly includes a seat back, a support post assembly, and a headrest assembly. The support post assembly is disposed on the seat back and has first and second posts and a cross member. The first and second posts each have a first end disposed proximate the seat back and a second end disposed opposite the first end. The cross member extends from the second end of the first post to the second end of the second post. The headrest assembly includes a trim cover and a mounting unit. The mounting unit has first and second mounting plates that cooperate to define a post cavity that receives the first and second posts. The second mounting plate has first and second slots. The cross member extends through the first and second slots such that a portion of the cross member is disposed outside the post cavity and between the trim cover and the second mounting plate.

In at least one embodiment a seat assembly is provided. The seat assembly includes a seat back, a support post assembly, and a headrest assembly. The support post assembly has a first post. The first post has a first end portion that is disposed in the seat back and a second end portion disposed opposite the first end portion. The second end portion has a U-shaped configuration that is curved such that an end of the second end portion extends toward the seat back. The headrest assembly is configured to move along the support post assembly between a first position and a second position. The headrest assembly has first and second mounting plates that cooperate to at least partially define a post cavity that receives the support post assembly. The first mounting plate includes a first set of ribs. Members of the first set of ribs are spaced part from each other and extend from the first mounting plate toward the second mounting plate. The second end portion engages each member of the first set of ribs when the headrest assembly is disposed between the first and second positions.

In at least one embodiment a seat assembly is provided. The seat assembly includes a seat back, a support post assembly extending from the seat back; a headrest assembly, and a latch mechanism. The headrest assembly is moveably disposed on the support post assembly and includes a mounting unit and first and second housings. The mounting unit defines a post cavity that receives the support post assembly and has a guide member opening. The first and second housings cooperate to receive the mounting unit. At least one of the first and second housings has a guide member that extends through the guide member opening and that has a set of notches. The latch mechanism includes a first latch member and a first biasing member. The first latch member is moveably disposed on the mounting unit and is configured to move between a latched position and an unlatched position. The first biasing member biases the first latch member toward the latched position. The first biasing member has a first end and a second end disposed opposite the first end that engages the mounting unit. The first biasing member engages the first latch member between the first and second ends. The first latch member includes first and second fingers that extend toward the first biasing member and that engage the mounting unit to guide movement of the first latch member.

DETAILED DESCRIPTION

Detailed embodiments of the present invention are disclosed herein; however, it is to be understood that the disclosed embodiments are merely exemplary of the invention that may be embodied in various and alternative forms. The figures are not necessarily to scale, some features may be exaggerated or minimized to show details of particular components. In addition, any or all features from one embodiment may be combined with any other embodiment. Therefore, specific structural and functional details disclosed herein are not to be interpreted as limiting, but merely as a representative basis for the claims and/or as a representative basis for teaching one skilled in the art to variously employ the present invention.

Figures 1, 3:
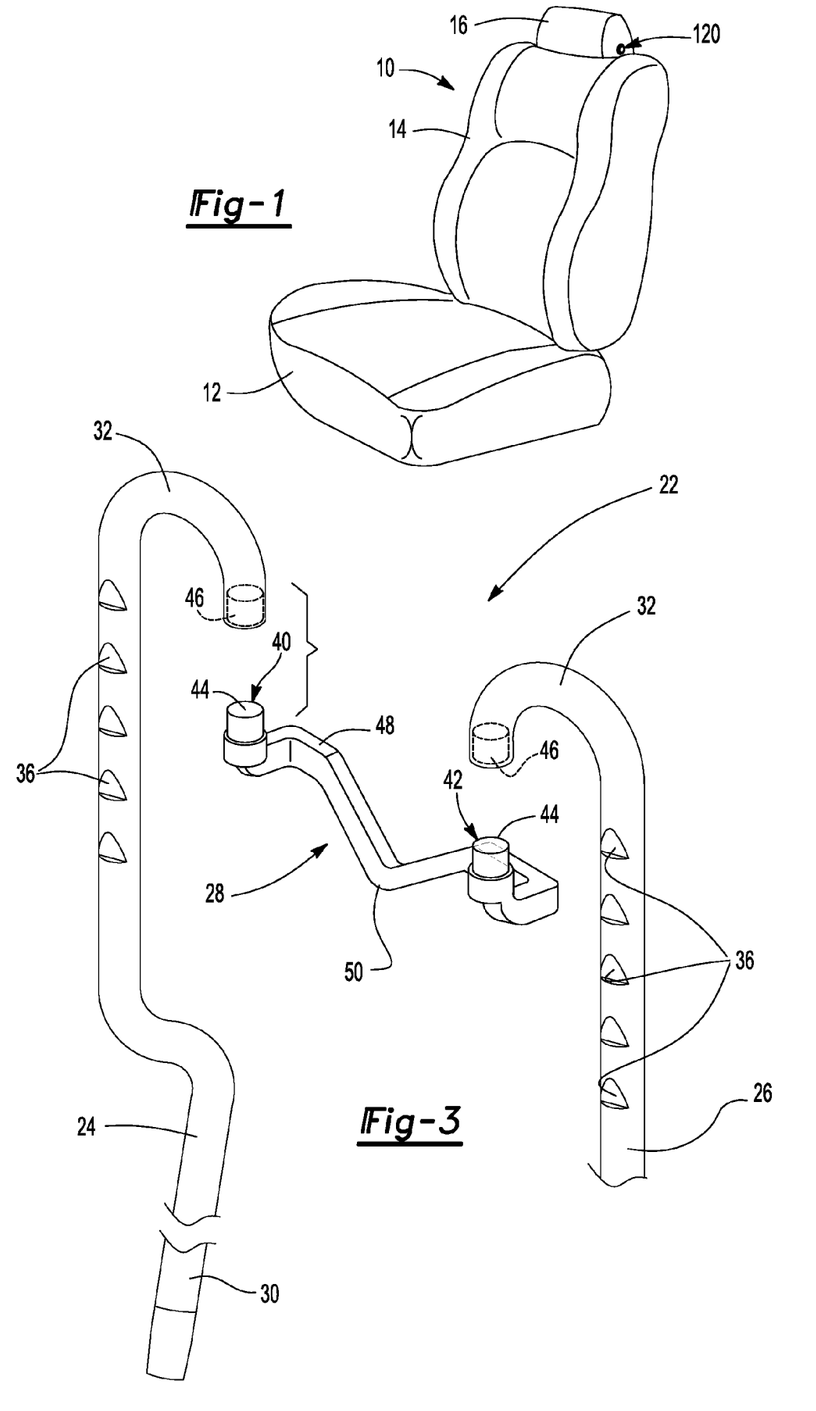
FIG. 1 is a perspective view of an exemplary seat assembly.
FIG. 3 is an exploded perspective view of the support post assembly of FIG. 2.

Referring to FIG. 1, an exemplary seat assembly 10 is shown. The seat assembly 10 may be configured for use in a vehicle, such as a motor vehicle like a car or truck.

The seat assembly 10 may include a seat bottom 12 and a seat back 14. In a vehicular application, the seat bottom 12 may be configured to be mounted on a support surface, such as a floor pan of a vehicle. The seat bottom 12 may be configured to support a seat occupant. The seat back 14 may be pivotally disposed on the seat bottom 12 and may include a head restraint assembly 16. The seat back 14 may be configured to support the back of a seat occupant.

Figure 2:
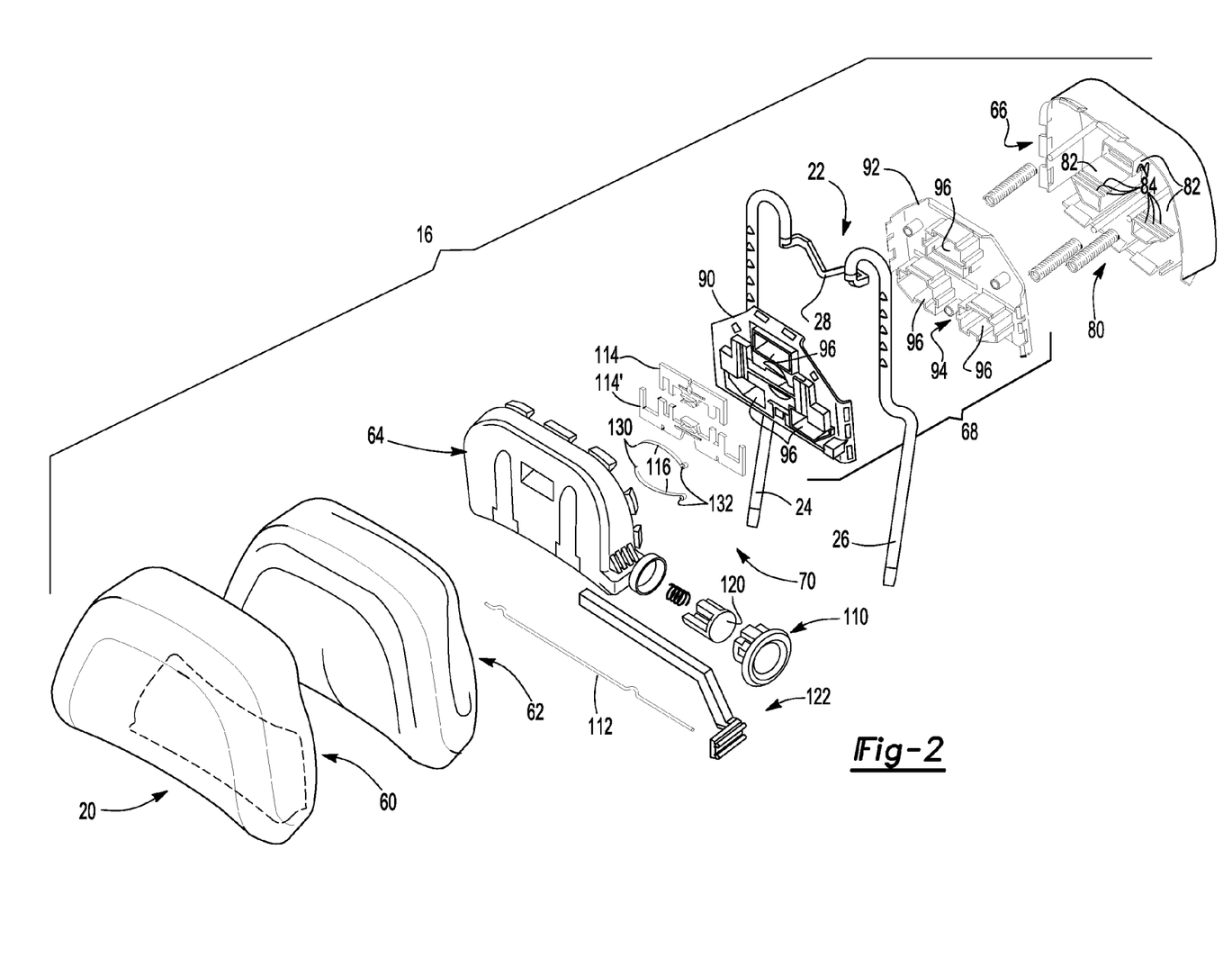
FIG. 2 is an exploded view of an exemplary head restraint assembly having a headrest assembly and a support post assembly.

Referring to FIGS. 2 and 3, the head restraint assembly 16 may include a headrest assembly 20 and a support post assembly 22. The headrest assembly 20 may be moveably disposed on the support post assembly 22 as will be described in more detail below. The support post assembly 22 may be disposed on the seat back 14 and may be made of any suitable material or materials, such as a metal or metal alloy. The support post assembly 22 may include a first post 24, a second post 26, and a cross member 28.

The first and second posts 24, 26 may extend through the top of the seat back 14. In addition, the first and second posts 24, 26 may each have a first end or first end portion 30 that may be fixedly mounted to a structural frame of the seat back 14 such that the first and second posts 24, 26 do not move with respect to the seat back 14. Alternatively, the first and second posts 24, 26 may move with respect to the seat back 14 in one or more embodiments. For instance, the first and second posts 24, 26 may be disposed in a guide sleeve that may be disposed on the frame of the seat back 14 or may be part of an active head restraint system that is configured to move in response to a load force or vehicle impact event.

Figure 6:
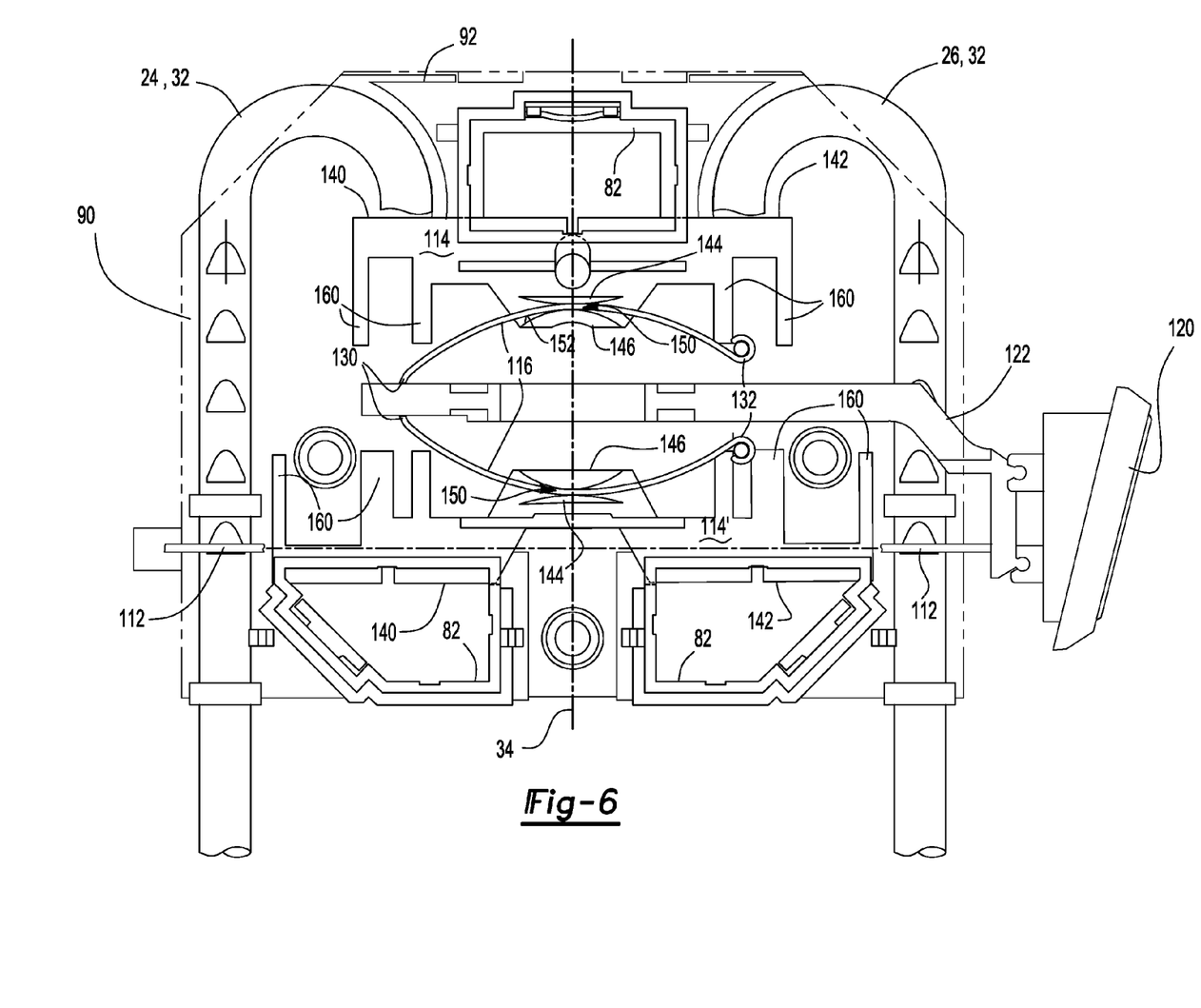
FIG. 6 is a fragmentary front side view of a portion of the head restraint assembly of FIG. 2 showing the headrest assembly in a first position and a latch mechanism in a latched position.

The first and second posts 24, 26 may each have a second end or second end portion 32 disposed opposite the first end portion 30. The second end portion 32 of the first post 24 may be generally coplanar with and may extend toward the second end portion 32 of the second post 26. Each second end portion 32 may be disposed within the headrest assembly 20 and may bend within the headrest assembly 20 to provide a configuration that helps inhibit tilting of the headrest assembly 20 in response to load forces or during movement. In at least one embodiment, each second end portion 32 may extend along a curved or arcuate path toward a center or center axis 34 of the headrest assembly 20 that is best shown in FIG. 6. For example, the second end portions 32 may be curved along a substantially constant radius and in one or more embodiments the second end portions 32 may have a substantially U-shaped configuration having a concave surface that faces downward, or generally toward the seat back 14 and the first end portion 30. As such, the ends or end surfaces of each second end portion 32 may extend further toward the seat back 14 than the area of curvature, which may be disposed near the top of the headrest assembly 20.

An upper region of the first and second posts 24, 26 that is disposed in the headrest assembly 20 may or may not be coaxially disposed with a lower region of the first and second posts 24, 26 that is not disposed in the headrest assembly 20. In the embodiment shown in FIG. 3, the upper regions of the first and second posts 24, 26 are substantially coplanar and are generally offset with respect to the lower regions. The upper regions of the first and second posts 24, 26 may each have a plurality of spaced apart notches 36 that provide discrete positions in which the headrest assembly 20 may be positioned along the support post assembly 22.

The cross member 28 may be disposed in the headrest assembly 20 and may couple the first post 24 to the second post 26. The cross member 28 may include a first end 40 and a second end 42 disposed opposite the first end 40. The first and second ends 40, 42 of the cross member 28 may engage the ends or second end portions 32 of the first and second posts 24, 26, respectively. In at least one embodiment, each end 40, 42 of the cross member 28 may include an integrally formed attachment feature 44 that may be received in a corresponding aperture 46 disposed in ends of the second end portions 32 of each post 24, 26. Alternatively, a separate fastener may be used or the second end portions 32 may be received in apertures in the cross member 28 in one or more embodiments.

The cross member 28 may also include a connecting portion 48 that is disposed between the first and second ends 40, 42. The connecting portion 48 may not be coplanar with the first and second posts 24, 26 and/or their respective second end portions 32. The connecting portion 48 may include a curved region 50 that may help provide structural support or reinforcement for the cross member 28 and support post assembly 22. In the embodiment shown, the curved region 50 may extend generally downward, or toward the seat back 14 to help reduce package space.

Referring to FIG. 2, the headrest assembly 20 may be configured to support the head of an occupant of the seat assembly 10. The headrest assembly 20 may be generally be disposed above the seat back 14 and may include a trim cover 60, a cushion 62, a first housing 64, a second housing 66, a mounting unit 68, and a latch mechanism 70.

The trim cover 60 may cover at least a portion of a visible exterior surface of the headrest assembly 20. The trim cover 60 may be made of any suitable material or materials, such as a fabric, vinyl, leather, or the like. The trim cover 60 may cover the cushion 62, which may be disposed under at least a portion of the trim cover 60.

The first and second housings 64, 66 may be disposed under the trim cover 60 and/or the cushion 62. The first and second housings 64, 66 may be made of any suitable material or materials, such as a polymeric material. The first and second housings 64, 66 may each have openings that face toward each other and cooperate to define a housing cavity 80 that at least partially receives the mounting unit 68 and the latch mechanism 70. The first and second housings 64, 66 may be fastened or connected to each other in any suitable manner. For instance, the first and second housings 64, 66 may be assembled together using one or more integral locking tabs that engage corresponding slots on the other housing 66, 64.

The first and second housings 64, 66 may also include one or more guide members 82. In the embodiment shown, three guide members 82 are shown that extend from the second housing 66 toward the first housing 64. Alternatively, one or more guide members 82 may extend from the first housing 64 toward or to the second housing 66 or may extend from both the first and second housings 64, 66 into engagement with each other. The guide members 82 may be generally hollow and may include a plurality of spaced apart notches 84. The notches 84 may provide discrete fore-aft locking positions at which the headrest assembly 20 may be positioned as will be discussed in more detail below.

The mounting unit 68 may be moveably disposed on the support post assembly 22. The mounting unit 68 may be provided as a single component or as multiple components. For instance, the mounting unit 68 may include a first mounting plate 90 and a second mounting plate 92 that may be located in the housing cavity 80 and may be disposed generally along opposite sides of the support post assembly 22. The first and second mounting plates 90, 92 may be attached or fastened to each other in any suitable manner, such as with one or more fasteners or with interlocking features like snap tabs. The first and second mounting plates 90, 92 may cooperate to define a post cavity 94 that may be disposed between the first and second mounting plates 90, 92. The post cavity 94 may receive the support post assembly 22.

The first and second mounting plates 90, 92 may include one or more guide member openings 96. In the embodiment shown, three sets of guide member openings 96 are provided. Each guide member opening 96 on the first mounting plate 90 may be aligned with a corresponding guide member opening 96 on the second mounting plate 92. Each guide member opening 96 may receive a corresponding guide member 82 and may be configured to permit the guide member 82 to move through the guide member opening 96 to facilitate fore-aft positioning of the headrest assembly 20, or movement generally toward or away from the head of a seat occupant.

Referring to FIGS. 2 and 4-8, the first and second mounting plates 90, 92 may be configured such that the first and second posts 24, 26 extend from the seat back 14 and into the post cavity 94 along opposing lateral or left and right sides of the mounting plates 90, 92. The second end portions 32 of the first and second posts 24, 26 may generally extend at least partially through openings 98 disposed at the top of the first and second mounting plates 90, 92 before extending toward each other and toward the center axis 34. In one or more embodiments, the openings 98 may be spaced apart from each other. A curved wall 100 may be disposed near the top of the first and/or second mounting plates 90, 92. The curved wall 100 may extend from the opening 98 and may be configured to engage the second end portion 32 of a corresponding post 24, 26 to limit downward movement of the headrest assembly 20 or movement toward the seat back 14.

Figure 5:
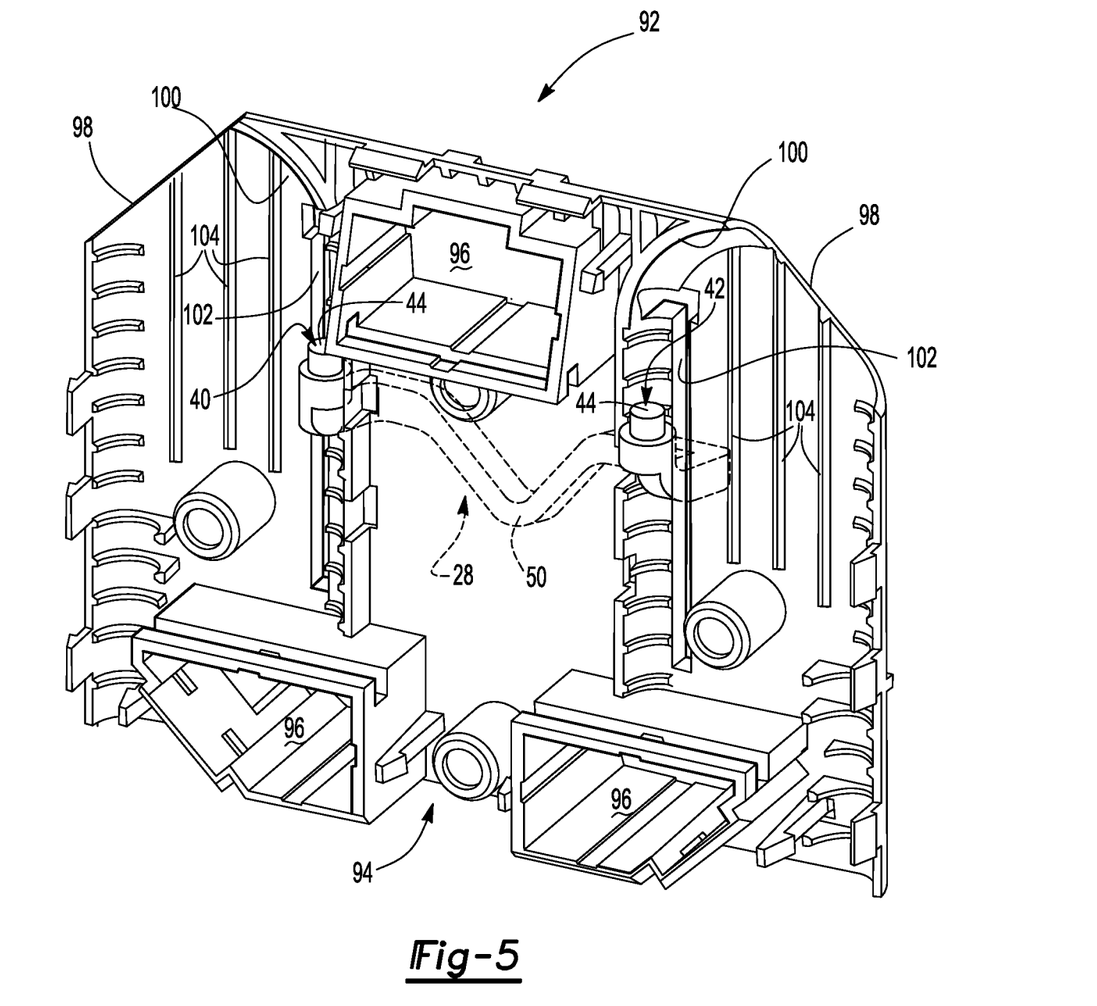

The second mounting plate 92 may include a pair of guide slots 102. The guide slots 102 may be spaced apart, may be substantially linear, and may extend substantially parallel to the center axis 34 and the direction of travel of the mounting unit 68 along the support post assembly 22. Each guide slot 102 may be generally aligned with an end of each post 24, 26. The cross member 28 may extend through the guide slots 102 such that the first and second ends 40, 42 are disposed in the post cavity 94 and the connecting portion 48 is disposed outside the post cavity 94 and in the housing cavity 80 between the second mounting plate 92 and the second housing 66.

Figure 4:
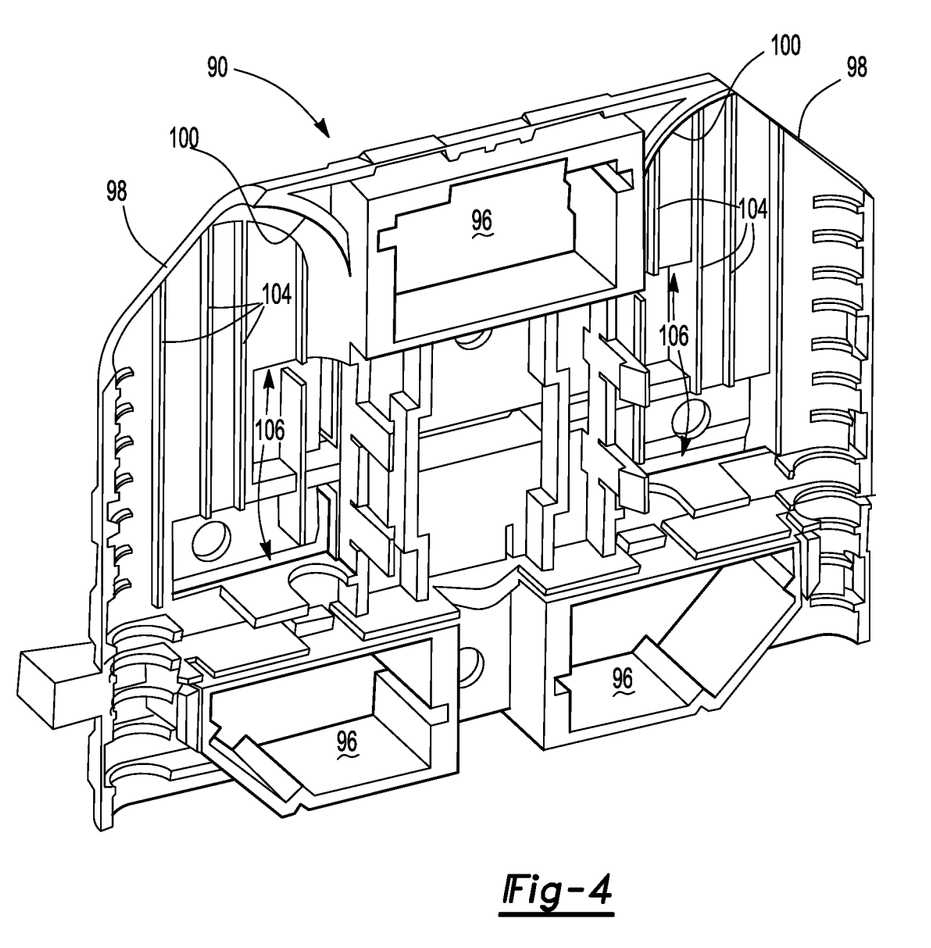
FIGS. 4 and 5 are perspective views of first and second plates of a mounting unit that may be provided in the headrest assembly.

The first and second mounting plates 90, 92 may also each include one or more sets or ribs 104. In the embodiment shown, each mounting plate 90, 92 includes two sets of ribs 104 that may generally extend from the opening 98 and/or curved wall 100. Members of each set of ribs 104 may be spaced apart from each other and may extend from a mounting plate 90, 92 into the post cavity 94. Members of each set of ribs 104 may be aligned with a corresponding member of another set 104. For instance, a member of a set of ribs 104 disposed on the first mounting plate 90 may be aligned or disposed directly across from a corresponding member on a set of ribs 104 disposed on the second mounting plate 92. Each rib 104 may be disposed substantially parallel to another member of the set and may extend along the direction of travel of the headrest assembly 20, or generally in a direction that extends from the top toward the bottom of a mounting plate 90, 92. In addition, each member of the set of ribs 104 on the second mounting plate 92 may be spaced apart from and extend substantially parallel to the guide slots 102.

Each set of ribs 104 may be positioned to engage the second end portion 32 of a corresponding post 24, 26. As such, the ribs 104 may help position the support post assembly 22 within the mounting unit 68 and may provide discrete points of contact that help reduce friction between the support post assembly 22 and the mounting unit 68 to reduce the force needed to actuate the headrest assembly 20.

The mounting unit 68 may also be configured to receive portions of the latch mechanism 70. As is best shown in FIG. 4, the first mounting plate 90 may include two pairs of latch member openings 106. Each latch member opening 106 may be spaced apart from another latch member opening 106 and may receive and facilitate movement of a latch member as will be discussed in more detail below.

Referring to FIGS. 2 and 6-8, an embodiment of a latch mechanism 70 is shown. The latch mechanism 70 may include an actuator assembly 110, a latch wire 112, one or more latch members 114, 114', and one or more biasing members 116.

The actuator assembly 110 may be configured to transmit an actuation force that actuates the latch wire 112 and the latch members 114 to enable movement of the headrest assembly 20 in one or more directions. For example, the actuator assembly 110 may include a button 120 that may be disposed on the headrest assembly 20 that may receive an actuation force from a user. Actuation of the button 120 may actuate the latch wire 112 and cause the latch wire 112 to disengage one or more notches 36 in the support post assembly 22, thereby permitting the headrest assembly 20 to move along the support post assembly 22 between a fully retracted or first position shown in FIG. 6 and a fully extended or second position shown in FIG. 8. Movement of the headrest assembly 20 may occur in response to force exerted on the headrest assembly 20, such as force exerted by a user or seat occupant. An example of a locking mechanism and wire that may be employed is described in U.S. Pat. No. 7,562,936, which is assigned to the assignee of the present application and is hereby incorporated by reference in its entirety.

Figure 7:
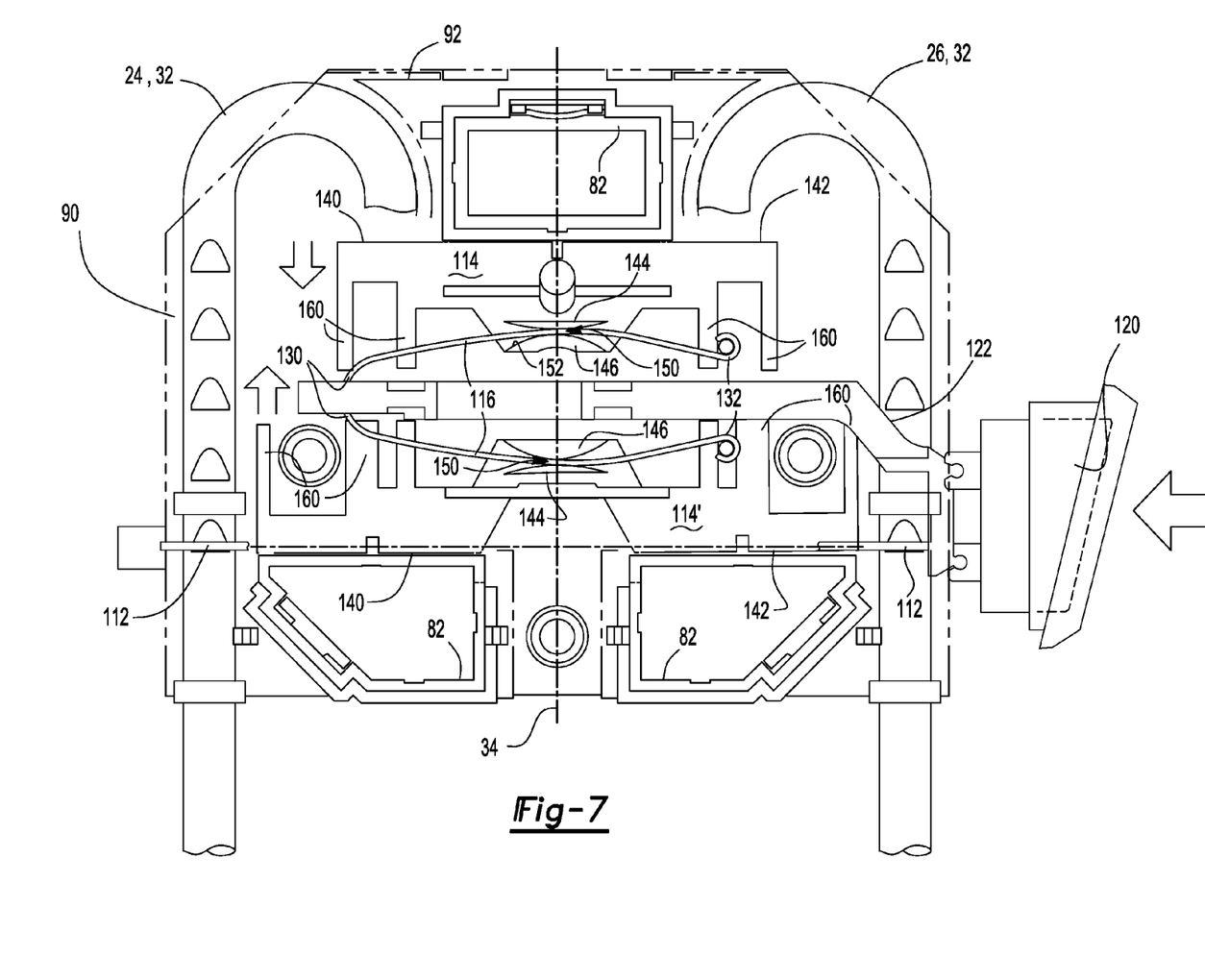
FIG. 7 is a fragmentary front side view of the head restraint assembly of FIG. 6 with the latch mechanism in an unlatched position.
Figure 8:
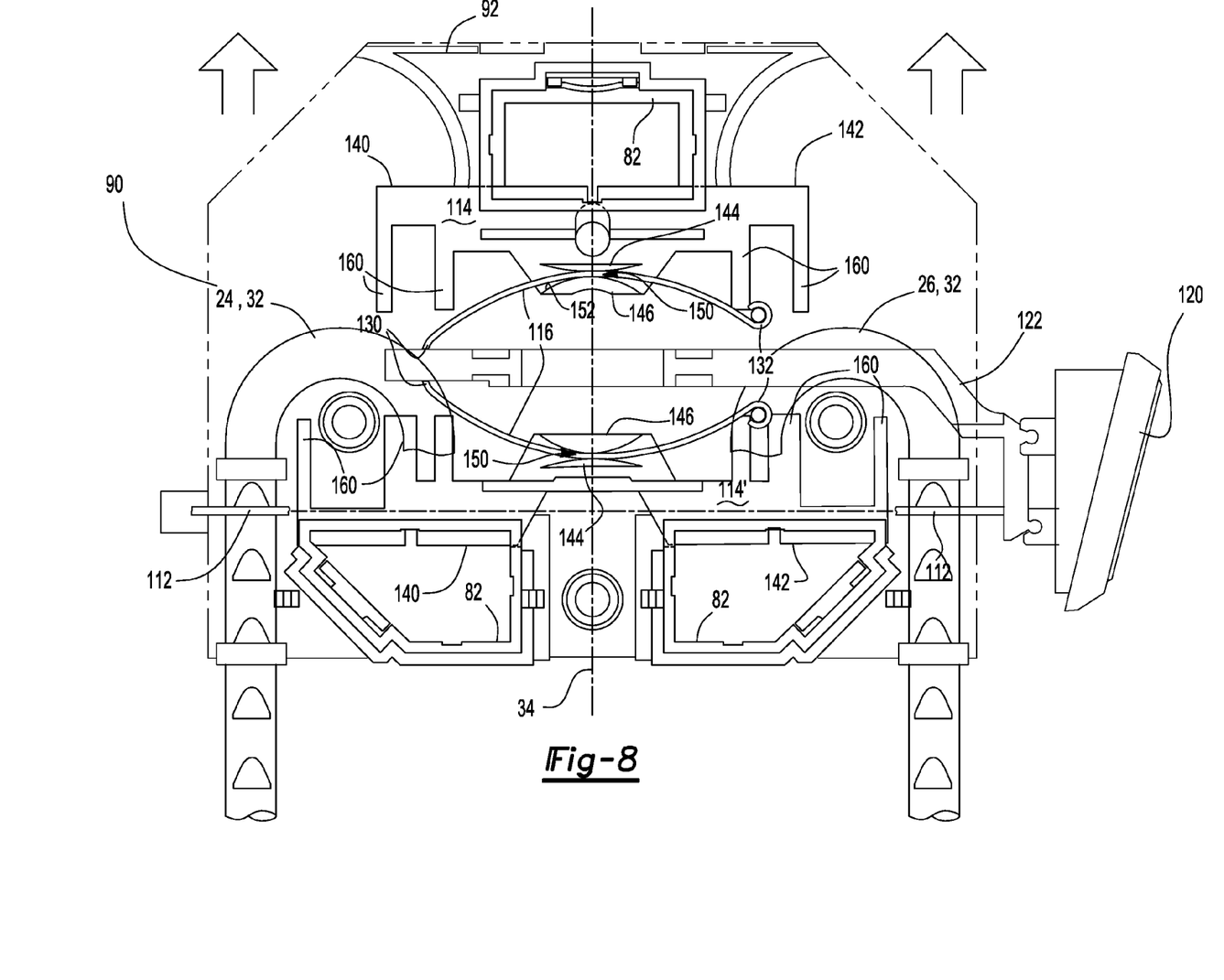
FIG. 8 is a fragmentary front side view of the head restraint assembly showing the headrest assembly in a second position.

Actuation of the button 120 may also enable movement of the headrest assembly 20 in a fore-aft direction, or toward or away from the head of a seat occupant. For instance, the button 120 may be configured to actuate a link 122. The link 122 may be disposed in the headrest assembly 20 and may engage one or more biasing members 116. In at least one embodiment, a biasing member 116 may be configured as one or more elongated curved bands that may have a first region or first end 130 that engages the link 122 and a second end 132 disposed opposite the first end 130 that is disposed on the mounting unit 68. A biasing member 116 may engage a latch member, such as upper latch member 114 and lower latch member 114', at a contact area disposed between the first and second ends 130, 132. As such, actuation of button 120 may actuate the link 122 and extend the biasing member 116 such that first region or end 130 moves away from the second end 132, thereby actuating the latch members 114, 114' toward each other and toward the link 122. The latch members 114, 114' may move away from each other and away from the link 122 in response to a biasing force exerted by the biasing members 116 when a sufficient actuation force is not applied to the button 120 and/or link 122.

The latch members 114, 114' may be received in guide slots in the first mounting plate 90 that may guide movement of the latch members 114, 114' toward or away from each other. The latch members 114, 114' may be configured to selectively engage a corresponding notch 84 on a guide member 82. The latch members 114, 114' may include a first end 140, a second end 142 disposed opposite the first end 140, and first and second projections 144, 146 disposed between the first and second ends 140, 142.

The first and second projections 144, 146 may be spaced apart from each other, thereby creating a gap 150 for receiving the biasing member 116. The second projection 146 may include a curved surface 152 along which the biasing member 116 may extend. The biasing member 116 may exert force on the first projection 144 when the latch member 114, 114' is actuated away from the link 122 and may exert force on the second projection 146 when the latch member 114, 114' is actuated toward the link 122.

One or more guide fingers 160 may extend from the first and second ends 140, 142. In the embodiment shown, two guide fingers 160 are provided that are spaced apart and extend substantially parallel to each other. The guide fingers 160 may be disposed closer to the link 122 than the projections 144, 146 to help stabilize and guide movement of a latch member 114, 114' throughout its range of motion. The guide fingers 160 may be received and move within a corresponding latch member opening 106. For simplicity, the latch member openings 106 and features that receive each latch member 114, 114' are not shown in FIGS. 6-8 so that the latch members 114, 114' can be more clearly shown.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A seat assembly comprising:
   a seat back;
   a support post assembly disposed on the seat back, the support post assembly including:
      first and second posts that each have a first end disposed proximate the seat back and a second end disposed opposite the first end; and
      a cross member that extends from the second end of the first post to the second end of the second post; and
   a headrest assembly that includes:
      a trim cover; and
      a mounting unit disposed in the headrest assembly that has first and second mounting plates that cooperate to define a post cavity that receives the first and second posts, the second mounting plate having a first slot and a second slot;
   wherein the cross member extends through the first and second slots such that a portion of the cross member is disposed outside the post cavity and between the trim cover and the second mounting plate.

2. The seat assembly of claim 1 wherein the headrest assembly further comprises a first housing and a second housing that cooperate to define a housing cavity, wherein the mounting unit is disposed in the housing cavity and a portion of the cross member is disposed in the housing cavity between the second housing and the second mounting plate.

3. The seat assembly of claim 1 wherein the cross member includes first and second mating features that are received in the second ends of the first and second posts, respectively.

4. The seat assembly of claim 1 wherein the first and second posts are fixedly disposed on the seat back.

5. The seat assembly of claim 1 wherein the cross member includes a curved region disposed outside the post cavity that extends toward the seat back.

6. The seat assembly of claim 1 wherein the first and second slots are spaced apart from each other.

7. The seat assembly of claim 1 wherein the first and second posts each include a second end portion that extends along an arcuate path and is disposed in the post cavity.

8. The seat assembly of claim 7 wherein the first mounting plate includes a curved wall disposed near a top surface of the first mounting plate, wherein movement of the headrest assembly toward the seat back is inhibited when a U-shaped portion of the first post engages the curved wall.

9. A seat assembly comprising:
   a seat back;
   a support post assembly having a first post that has a first end portion that is disposed in the seat back and a second end portion disposed opposite the first end portion, the second end portion having a U-shaped configuration that is curved such that a distal end of the second end portion extends toward the seat back; and
   a headrest assembly configured to move along the support post assembly between a first position and a second position, the headrest assembly including first and second mounting plates that cooperate to at least partially define a post cavity that receives the support post assembly, wherein the first mounting plate includes a first set of ribs, wherein members of the first set of ribs are spaced apart from each other and extend from the first mounting plate toward the second mounting plate;
   wherein the second end portion engages each member of the first set of ribs when the headrest assembly is disposed between the first and second positions.

10. The seat assembly of claim 9 wherein members of the first set of ribs are disposed substantially parallel to each other.

11. The seat assembly of claim 9 wherein the second mounting plate further comprises a second set of ribs that are spaced apart and extend from the second mounting plate into the post cavity.

12. The seat assembly of claim 11 wherein each member of the first set is aligned with a corresponding member of the second set.

13. The seat assembly of claim 9 further comprising a second post that has a first end portion that is disposed in the seat back and a second end portion disposed opposite the first end portion, the second end portion having a U-shaped configuration that is curved such that a distal end of the second end portion extends toward the seat back.

14. The seat assembly of claim 13 further comprising a cross member that extends from the second end portion of the first post to the end of the second end portion of the second post.

15. The seat assembly of claim 13 wherein the second end portions of the first and second posts extend toward each other before extending toward the seat back.

16. A seat assembly comprising:
   a seat back;
   a support post assembly extending from the seat back;
   a headrest assembly moveably disposed on the support post assembly, the headrest assembly including:
      a mounting unit that defines a post cavity that receives the support post assembly, the mounting unit having a guide member opening; and
      first and second housings that cooperate to receive the mounting unit, at least one of the first and second housings having a guide member that extends through the guide member opening and that includes a set of notches; and
   a latch mechanism that includes:
      a first latch member that is moveably disposed on the mounting unit and configured to move between a latched position in which the latch member engages a member of the set of notches to inhibit movement of the headrest assembly away from a head of a seat occupant and an unlatched position to permit movement of the headrest assembly away from the head of a seat occupant; and
      a first biasing member that biases the first latch member toward the latched position, the first biasing member having a first end and a second end disposed opposite the first end and that engages the mounting unit, wherein the first biasing member engages the first latch member between the first and second ends;
   wherein the first latch member includes first and second fingers that extend toward the first biasing member and that engage the mounting unit to guide movement of the first latch member.

17. The seat assembly of claim 16 wherein the first and second fingers extend from opposite ends of the first latch member.

18. The seat assembly of claim 16 wherein the first and second fingers extend further toward the first biasing member than a location where the first biasing member engages the first latch member to help guide movement of the first latch member.

19. The seat assembly of claim 16 further comprising a second latch member that is spaced apart from the first latch member and a second biasing member that biases the second latch member away from the first latch member.

20. The seat assembly of claim 19 wherein the second latch member includes first and second fingers that extend toward the first biasing member and engage the mounting unit to guide movement of the second latch member.

* * * * *